(12) United States Patent
Grün

(10) Patent No.: US 8,688,366 B2
(45) Date of Patent: Apr. 1, 2014

(54) METHOD OF OPERATING A NAVIGATION SYSTEM TO PROVIDE GEOGRAPHIC LOCATION INFORMATION

(75) Inventor: Raimund Grün, Eschborn (DE)

(73) Assignee: Navteq B.V., Veldhoven (NL)

( * ) Notice: Subject to any disclaimer, the term of this patent is extended or adjusted under 35 U.S.C. 154(b) by 79 days.

(21) Appl. No.: 13/185,654

(22) Filed: Jul. 19, 2011

(65) Prior Publication Data

US 2013/0024108 A1    Jan. 24, 2013

(51) Int. Cl.
*G01C 21/00* (2006.01)

(52) U.S. Cl.
USPC ............................................. 701/400

(58) Field of Classification Search
USPC ................................ 701/200, 400
See application file for complete search history.

(56) References Cited

U.S. PATENT DOCUMENTS

| | | | |
|---|---|---|---|
| 6,611,755 B1 * | 8/2003 | Coffee et al. | 701/482 |
| 6,934,634 B1 | 8/2005 | Ge | 702/2 |
| 7,039,640 B2 | 5/2006 | Miller et al. | 707/10 |
| 7,257,570 B2 * | 8/2007 | Riise et al. | 707/706 |
| 7,469,182 B2 | 12/2008 | Huang et al. | 701/200 |
| 7,539,693 B2 * | 5/2009 | Frank et al. | 1/1 |
| 2006/0022048 A1 * | 2/2006 | Johnson | 235/462.1 |
| 2006/0271281 A1 * | 11/2006 | Ahn et al. | 701/208 |
| 2008/0162513 A1 | 7/2008 | Biard et al. | 707/100 |
| 2008/0228728 A1 | 9/2008 | Frank et al. | 707/3 |
| 2009/0005987 A1 * | 1/2009 | Vengroff et al. | 701/300 |
| 2009/0187538 A1 * | 7/2009 | Grun | 707/3 |
| 2011/0022292 A1 * | 1/2011 | Shen et al. | 701/200 |
| 2011/0184636 A1 * | 7/2011 | Rolf et al. | 701/200 |

\* cited by examiner

*Primary Examiner* — Behrang Badii
*Assistant Examiner* — Daniel L Greene
(74) *Attorney, Agent, or Firm* — Lempia Summerfield Katz LLC

(57) ABSTRACT

A computer implemented method of operating a navigation system to provide geographic location information is provided. The method comprises receiving a query text string representing a query for a geographic location and providing a plurality of candidate geographic locations for the queried geographic location from a geographic database. The method receives a selection of one of the candidate geographic locations from a user and records the candidate geographic location that was selected in a use history database. The method increases a usage pattern weight for the candidate geographic location that was selected and increases a usage pattern weight for a parent geographic feature that includes the candidate geographic location that was selected.

20 Claims, 4 Drawing Sheets

US 8,688,366 B2

METHOD OF OPERATING A NAVIGATION SYSTEM TO PROVIDE GEOGRAPHIC LOCATION INFORMATION

BACKGROUND OF THE INVENTION

The present invention relates to a method and system for operating a navigation system, and more particularly to a method and system for geocoding a query for geographic location information using prior usage patterns.

Navigation systems are available that provide end users with various navigation-related functions and features. For example, some navigation systems are able to determine an optimum route to travel along a road network from an origin location to a destination location in a geographic region. Using input from the end user, the navigation system can examine various potential routes between the origin and destination locations to determine the optimum route. The navigation system may then provide the end user with information about the optimum route in the form of guidance that identifies the maneuvers required to be taken by the end user to travel from the origin to the destination location. Some navigation systems are able to show detailed maps on displays outlining the route, the types of maneuvers to be taken at various locations along the route, locations of certain types of features, and so on.

In order to provide these and other navigation-related functions and features, navigation systems use geographic data. The geographic data may be in the form of one or more geographic databases that include data representing physical features in the geographic region. The geographic database includes information about the represented geographic features, such as one-way streets, position of the roads, speed limits along portions of roads, address ranges along the road portions, turn restrictions at intersections of roads, direction restrictions, such as one-way streets, and so on. Additionally, the geographic data may include points of interests, such as businesses, facilities, restaurants, hotels, airports, gas stations, stadiums, police stations, and so on.

In order to provide some of the navigation-related functions and features, the navigation system obtains a query for geographic location information, such as address information. For example, the query is 425 West Randolph, Chicago. Typically, the navigation system geocodes the query. Geocoding is the process of finding associated geographic information, such as geographic coordinates of latitude and longitude, from geographic information of a different format, such as the query comprising the street address. With the geographic coordinates, the navigation system can provide navigation-related functions and features, such as a detailed map showing the geographic location information corresponding to the query on a display.

Although navigation systems provide many important features, there continues to be room for new features and improvements. One area for improvement is how the geocoding process resolves ambiguous queries. Ambiguities often happen because of misspellings or the queries have varying formats with different abbreviations for street address information, such as "Street," "St" "West," and "W." When there are ambiguities, the query may not provide an exact match with reference geographic data of a geographic database; rather, there are several candidate matches. For example, if a user enters "425 Randolph, Chicago" possible candidate locations include "425 West Randolph Street Chicago Ill." and "425 East Randolph Street Chicago Ill." Thus, there is a need to accurately and efficiently determine which of candidate locations to present to the user.

SUMMARY OF THE INVENTION

To address these and other objectives, the present invention comprises a computer implemented method for operating a navigation system to provide geographic location information. The method comprises receiving a text string query for a geographic location and providing a plurality of candidate geographic locations for the queried geographic location from a geographic database. The method receives a selection of one of the candidate geographic locations from a user and records the candidate geographic location that was selected in a use history database. The method increases a usage pattern weight for the candidate geographic location that was selected and increases a usage pattern weight for a parent geographic feature that includes the candidate geographic location that was selected.

According to another aspect, the present invention comprises a navigation system. The navigation system comprises a geographic database, a computer and a geocoding program executed on the computer. The geocoding program receives a query text string, provides a plurality of candidate locations, receives a selection of one of the candidate locations, increases a usage pattern weight for the candidate location that was selected, and increases a usage pattern weight for a parent geographic feature that includes the candidate location that was selected.

BRIEF DESCRIPTION OF THE DRAWINGS

An exemplary embodiment of the present invention is described herein with reference to the following drawings.

DETAILED DESCRIPTION OF THE PRESENTLY PREFERRED EMBODIMENTS

I. Navigation System

Figure 1:
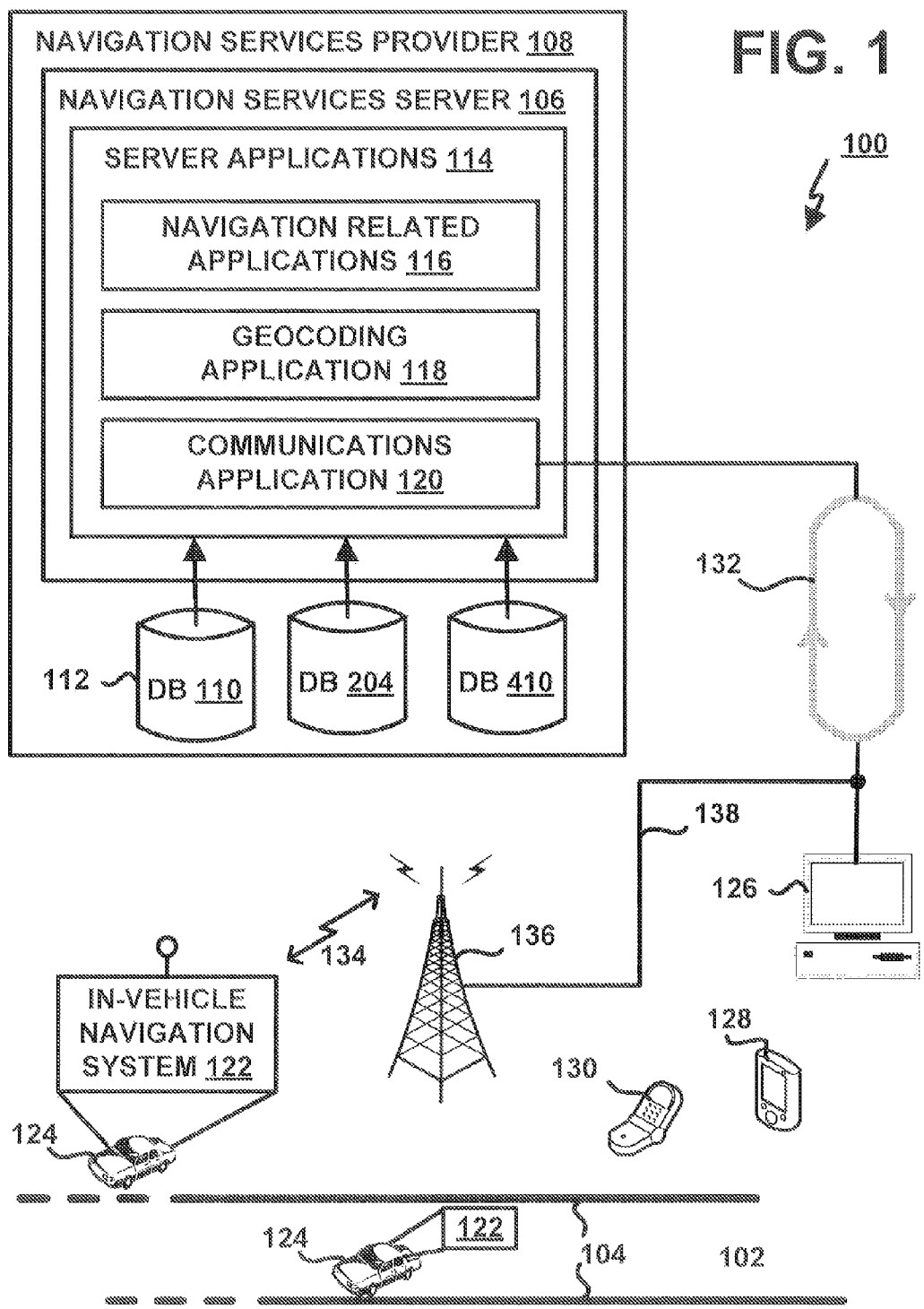
FIG. 1 is a block diagram of a navigation system, according to an exemplary embodiment.

FIG. 1 illustrates an example navigation system 100 for providing navigation related function and features. The navigation system serves end users (e.g., pedestrians, vehicle drivers and passengers, as well as other persons) in a geographic region 100. The navigation system 100 is used by the end users to obtain navigation-related services (including map-related services) with respect to the geographic region 102. The navigation-related services include information about travel along the road network 104 (as well as pedestrian network, bicycle network and public transit network) in the geographic region 102, including route calculation and guidance, people and business finding services (e.g., electronic yellow and white pages), maps, point of interest searching, destination selection, and so on.

The navigation system 100 is a combination of hardware, software and data. The navigation system 100 includes remote components (i.e., hardware, processors, software or data located at a central location that is remote from the end users) and local components (i.e., hardware, software, or data located physically with each end user). There are various different kinds of mobile or portable computing platforms that provide geographically-related features and services.

Included among the remote components of the navigation system 100 is a navigation services server 106. The navigation services server 106 includes appropriate computer hardware and software to run network applications. The navigation services server 106 is maintained and operated by a navigation services provider 108. The navigation services provider 108 may be any entity having a web-based map site or any entity providing navigation related functions and features.

Associated with the navigation services server 106 is the geographic database 110. The geographic database 110 is stored on a computer readable storage medium 112 or computer storage that is accessible to the navigation services server 106. The storage medium 112 may include one or more hard drives or any type of storage media. The geographic database 110 may be organized to facilitate performing navigation-related functions. In one embodiment, the geographic database 110 is developed by NAVTEQ North America, LLC of Chicago, Ill. However, it is understood that the inventive concepts disclosed herein are not restricted to any particular source of data.

The local components of the navigation system 100 include the various computer platforms operated by the end users to request and obtain navigation-related and map-related features and geographic data from the navigation services provider 108. These various computer platforms (also referred to as "end user computing platforms," "client computing platforms" or "user devices") may include in-vehicle navigation system units 122 located in vehicles 124, personal computers 126, personal organizers (e.g., PDAs) 128, wireless phones 130, smart phones, portable computers, tablet computers or any other types of computing devices that have the appropriate hardware and software (including a processor that executes software programs) to access the navigation services provider 108 over a communications link 132.

The communications link 132 may use any suitable technology and/or protocols that are currently available, as well as technology and/or protocols that become available in the future. For example, the communications link may use WAP, TCP/IP, etc. More than one protocol may be used in the communications link 132 with appropriate conversions. The communications link 132 may be part of, or connected to, the Internet.

A portion of the communications link 132 may include a wireless portion 134. The wireless portion 134 of the communications link 132 enables two-way communication between the mobile end user computing platforms and the service provider 108. The wireless portion 134 may be implemented by any suitable form of wireless communication, including cellular, PCS, satellite, FM, radio, Bluetooth®, other long and short range transmission technologies or technologies that may be developed in the future. The wireless portion 134 may include one or more transmitters 136, such as a transponder tower, an antenna tower, an FM tower, satellites, other suitable means or others developed in the future. The transmitters 136 include an appropriate communication link 138 to the communications link 132 and/or service provider 108. This link 138 may be land-based or may be wireless. The transmitters 136 include suitable technology that enables two-way communication between the service provider 108 and the mobile end user computing platforms.

Referring to FIG. 1, server applications 114 are included on the navigation services server 106 of the navigation services provider 108. In one embodiment, the server applications 114 may be stored on one or more hard drive(s), computer storage or any other storage media operated by the server 106 and loaded into a memory of the server to run. One of the server applications 114 is a communications application 120. The communications application 120 interfaces with the communication link 132 in order to receive messages from and send messages to the end user computing platforms.

Included among the server applications 114 are navigation-related applications 116. The navigation-related applications 116 use the geographic database 110 associated with the navigation services server 106 in order to provide the various different types of navigation-related services. In order to provide navigation-related features, the navigation-related applications 116 use data from the geographic database 110. One of the navigation-related applications 116 is route calculation. End users may access the navigation services provider 106 to obtain route calculation. Given data that identify the positions of an origin and destination, the route calculation application calculates a route between the origin and the destination. The route calculation application may use any of various means or algorithms for this purpose. Another of the navigation applications on the server 106 is route guidance. Route guidance uses the output from the route calculation application to provide instructions for the end user to travel to the desired destination. Other navigation-related applications 116 provide map generation and display, positioning (e.g., map matching), point of interest and destination search, and so on.

The server applications 114 also include a geocoding application 118. The geocoding application 118 performs a geocoding process that generally translates a user query for location information into some other geographic format. For example, the user query commonly has the form of an address such as "425 W Randolph, Chicago" and the geocoding process translates the input information into some other format, such as a proprietary format or latitude and longitude coordinates. The geocoding process will be described in detail below in conjunction with FIG. 2. The server applications 114 may include other software applications as well.

II. Geocoding Process

Geocoding is the process of finding associated geographic location information, such as geographic coordinates of latitude and longitude, from geographic information of a different format, such as street addresses. With the geographic coordinates, the navigation system can provide navigation-related functions and features, such as a detailed map highlighting the location of the user query on a display associated with the end user computing platform.

Although navigation systems provide many important features, there continues to be room for new features and improvements. One area for improvement is how the geocoding process resolves ambiguous user input location information (or user query). Ambiguities often happen because of missing information, misspellings, errors or the user query has varying formats with different abbreviations for street address information, such as "Street," "St," "West," and "W." When there are ambiguities, the user query may not provide an exact match with reference geographic data of a geographic database; rather, there are several candidate locations. For example, if a user enters "425 Randolph Street Chicago" possible candidate locations include "425 West Randolph Street Chicago Ill." and "425 East Randolph Street Chicago Ill." Thus, there is a need to accurately and efficiently determine which of the candidate locations to present to the user.

Figure 2:
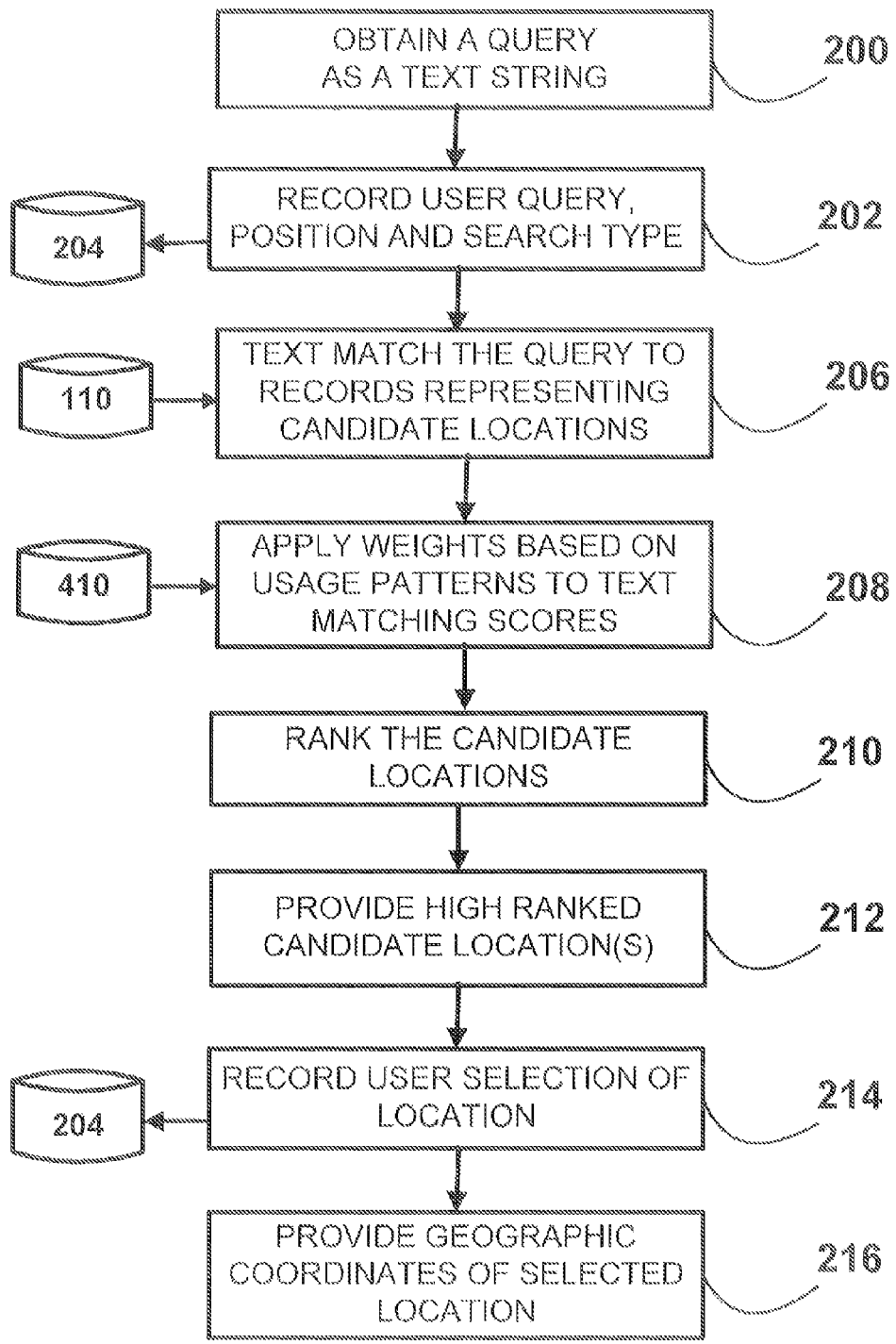
FIG. 2 is a flow chart of a method for geocoding, according to an example embodiment.

FIG. 2 illustrates a flow chart of the geocoding process according to one embodiment. At step 200, the geocoding application 118 obtains a query as a text string. The user enters the query via a user interface on his or her computing platform that is communicated to the navigation services server 106 and provided to the geocoding application 118. The query may be part of a request for one of the navigation related applications 116, such as a query for destination selection, routing, point of interest search, business finding and so on. For example, the query text string may be "Broadway New York". Alternatively, the query may take different forms including place name, address comprising some of the following: number, street name, city, state, zip code, country and so on. Additionally, the query may be a point of interest name, a landmark name and a marketing name for an event, such as FIFA World Cup or Super Bowl. Furthermore, the query may originate as a speech input that is converted into the text string or similar form.

At step 202, the geocoding application 118 records the user query in a user query record that is stored in a geocoder use history database 204. The geocoder use history database 204 is stored on a computer readable storage medium 112 or computer storage that is accessible to the navigation services server 106. In an alternative embodiment, the geocoder use history database is stored off-line in computer memory associated with the end user computer device, and the data of the geocoder use history database is occasionally sent to the navigation server.

In one embodiment, the geocoding application 118 stores the user query as a text string and also stores a time stamp indicating the time and date that the server 106 received the user query. In another embodiment, the geocoding application 118 obtains and records in the geocoder use history database 204 a current position of the device that submitted the query, the type of device that submitted the query, and the search type, such as a point of interest search, free text search, search for route calculation and guidance, people and business finding search, request for maps, destination selection, and so on. The geocoder application 118 may receive the current position, type of device and search type from the navigation application 116 that will use the output of the geocoding process.

At step 206, the geocoding application 118 compares the query to data records representing known locations or candidate locations. The geocoding application text matches the text string of the query against text strings of the data records representing known locations or candidate locations. The geocoding application 118 obtains the data records representing candidate locations from the geographic database 110. In one embodiment, each record r includes a set of fields F {e.g. Street, City, Zip}, and the record r maps every field in F to a text string. The data records representing candidate locations provide text strings of the address, point of interest name, landmark name, or marketing name. These candidate location data records also provide the geographic coordinates of the location represented in the geographic database 110. Additionally, these candidate location database records include a database record identification by which the data record representing the geographic feature, such as the point of interest, can be uniquely identified in the geographic database 110. When matching the query against one of the candidate location records, the geocoding application 118 computes a text matching score or a set of text matching scores as described in the following.

In one embodiment, the geocoding application 118 performs textual matching by computing for each field a field score $s_f$ representing the amount of the text of the query matching the text in that field of the record. The field score is defined as for every field f is an element of the set F, there is a score $s_f$ with a value between zero and one that indicates how much of a fraction of the text of the query is covered by the text in the field f of the record. For an example query of "Broadway New York" and the Street field of the record r is the text "West Broadway", the score for the Street field $s_{Street}$ would be roughly 0.5 since "Broadway" of the query fits to "Broadway" in the text of the Street field, but the rest of the query ("New York") is not contained in the Street field's text. The score for the City field $s_{City}$ is also computed. For the example query of "Broadway New York" and the City field of the record r is the text "New York City", the score for the City field $s_{City}$ would be roughly 0.5 since "New York" of the query fits to "New York City" in the text of the City field, but the rest of the query ("Broadway") is not contained in the City field's text. Scores for the other fields of the record are computed in a similar manner. Furthermore, field scores for other records of candidate locations are computed in a similar manner.

In one embodiment, the geocoding application 118 uses the field scores $s_f$ to compute a score representing how well the query matched the record. This score $s_r$ represents how much a fraction of the query is covered by the text of the complete record by summing the above computed scores $s_f$ for each field of the record ($s_r = \Sigma s_f$). For example, if the query is "Broadway New York" and the Street field of the record is the text "West Broadway" and the City field of the record is "New York City", the score $s_0$ is 1 since the complete query text is contained in the record's texts.

In another embodiment, the geocoding application 118 computes for each of the fields in the record a text matching score $b_f$ with a value between zero and 1 that indicates how much of a fraction of the text of the field f in the record is contained in the query. For an example query of "Broadway New York" and the Street field of the record r is the text "West Broadway", the score for the Street field $b_{Street}$ would be roughly 0.7 since the "Broadway" portion of the Street field text of the record fits to "Broadway" in the query text, but the rest of the text is not contained in the query text. The score for the City field $b_{City}$ and the other fields of the record are also computed. The scores $b_f$ may also be used to compute a score representing how well the record matched the query. This score $b_0$ represents how much a fraction of the text of the record is covered by the text of the query by summing the above computed scores $b_f$ for each field of the record ($b_0 = \Sigma b_f$). The overall score $b_0$ may be normalized to provide a score between 0 and 1. The above are examples of scores for text matching; however, other text matching scores known to those skilled in the art are possible.

After the step of text matching the query to a plurality of records representing different candidate locations (step 206), the geocoding application 118 applies weights based on usage patterns to the text matching scores to obtain an overall score for the candidate location at step 208. The weights based on usage patterns will be described in detail below. The geocoding application 118 computes an overall score for each of the candidate locations by applying to the text matching scores a usage pattern weight for the respective candidate location.

In one embodiment, each record has a usage pattern weight or rating that is a value representing a use pattern based on user feedback. As will be described below, the geocoding application 118 presents ranked candidate locations to the user based upon the query, and the user selects one of the presented candidate locations. In one embodiment of the present invention, the user selections or user feedback is recorded and used to determine the value of the usage pattern weight. The usage pattern weight represents a frequency of demand for the candidate location. For an example, a record of Broadway, New York, N.Y. would have a value of 5 for its usage pattern weight w' while a record of Broadway, Yakima, Wash. would have a value of 1 for its usage pattern weight w' because user feedback establishes that a vast majority of users selected the candidate location of Broadway, New York, N.Y. The method for determining the usage pattern weight will be described in more detail below in conjunction with FIG. 4.

The overall scores for the candidate locations are then used to rank the candidate locations at step 210. The geocoding application 118 ranks the candidate locations into a results set comprising a subset of the candidate locations, such as five, by ranking the candidate locations by their respective overall score. For example, the candidate locations are sorted by their overall score from highest to lowest value and the candidate locations with the highest five scores are identified.

Figure 3:
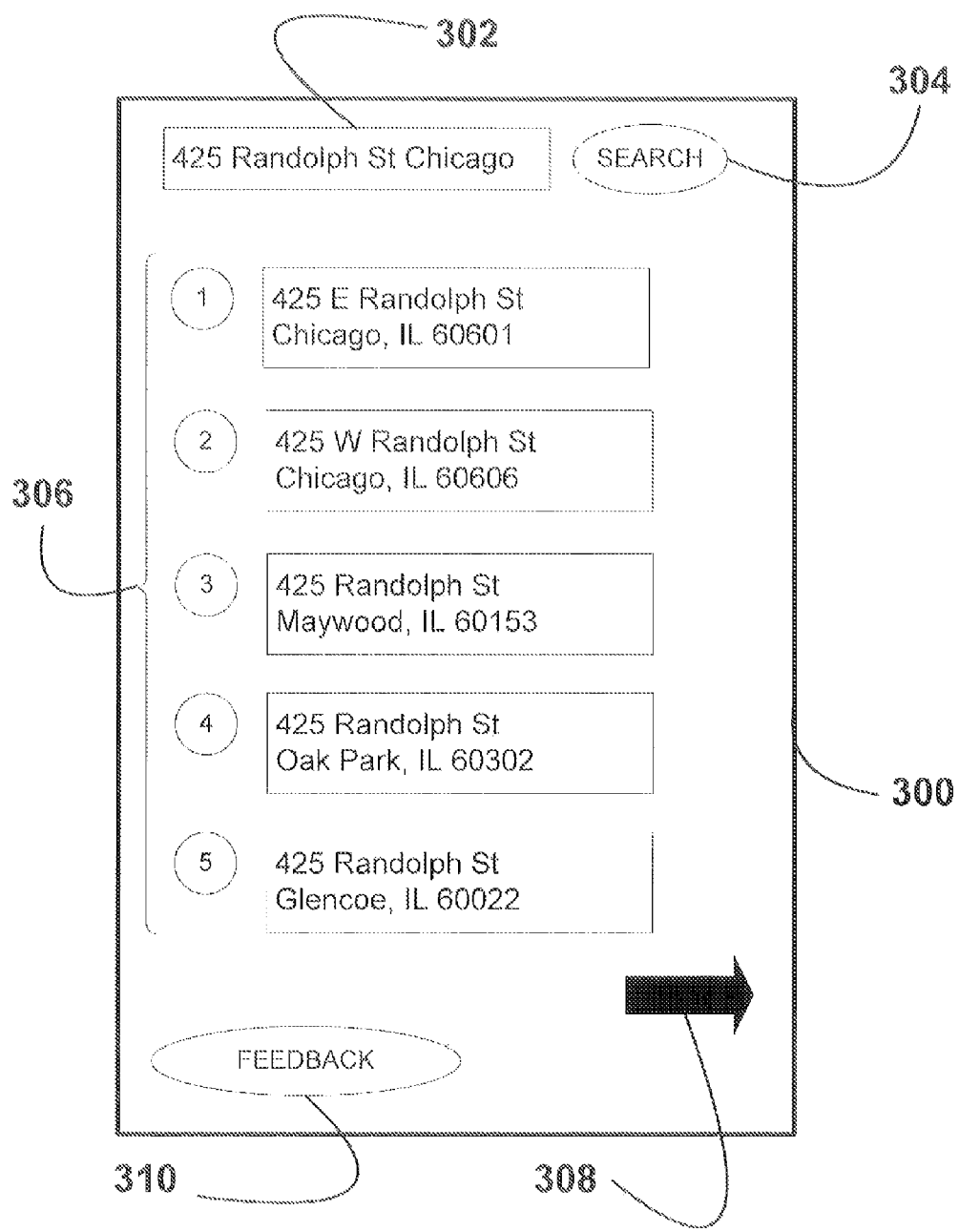
FIG. 3 is a block diagram of a display screen of the navigation system, according to an example embodiment.

At step 212, the geocoding application 118 provides the highest ranked candidate locations as the results set. FIG. 3 illustrates a portion of a display screen 300 on a user computing platform, such as a wireless phone 130. The display screen includes the query "425 Randolph Street Chicago" in a query box 302. The user entered this query and selected the search icon 304 to send the query to the navigation services server 106. Based on the query, the geocoding application 118 has determined a results set of candidate locations matching the query. The navigation services server 106 provides the results set to the user computing platform, and the user computing platform shows the results set 306 on the display screen 300. As shown in FIG. 3, the names of five candidate locations are displayed. Additionally, the display screen 300 includes a next arrow 308 that provides a link to the next five highest ranked candidate locations. The user then selects one of the candidate locations in the results set 306 or selects the next arrow 308.

In one embodiment, the display screen 300 shown in FIG. 3 also includes a feedback button 310. By selecting the feedback button 310, the user may provide feedback regarding the results set 306. For example, the feedback may comprise the user selecting one of a plurality of ratings for the perceived quality of the results, such as great results, good results, and poor results. In another embodiment, the feedback may comprise the entry of text comments regarding the search results, such as an indication that the results are for the wrong city or country. In one embodiment, the geocoding application 118 receives the feedback from the device via the server 106. The geocoding application 118 stores the feedback information in the geocoder use history database 204 and associates the feedback information with the query.

In one embodiment, data representing the selected candidate location is sent by the wireless phone 130 to the navigation services server 106. The geocoding application 118 receives the data representing the selected candidate location. At step 214 of FIG. 2, the geocoding application 118 records the user selected candidate location in a geocoder use history database 204. In one embodiment, the geocoding application 118 stores the user selected candidate location and corresponding field scores and weight values in the geocoder use history database 204. In another embodiment, the geocoding application 118 stores the rank number of the selected result, such as result number three of the result set 306, in the geocoder use history database 204.

At step 214, the geocoding application 118 provides the geographic coordinates (latitude, longitude and altitude) of the user selected candidate location to one of the navigation related applications 116 of the navigation services server 106. For example, the geocoding application 118 provides the geographic coordinates to a routing application that uses the geographic coordinates as an intended destination for a route. In another embodiment, the geocoding application 118 performs steps 208 and 214 together. That is, the geocoding application 118 provides the highest ranked candidate locations as the results set and provides the geographic coordinates (latitude, longitude and altitude) of the results set to one of the navigation related applications 116 of the navigation services server 106 without the user selection. In another embodiment, the geographic application 118 provides an identification number or ID of selected candidate location to one of the navigation related applications.

In one embodiment, the geocoding application 118 obtains information from the navigation-related application that used the geographic information from the geocoding process. For example, the geocoding application 118 obtains information indicating whether the user of the destination selection application routed to the selected candidate location, placed a telephone call to the business associated with the selected candidate location, opened a website of the business associated with the selected candidate location, requested and reviewed additional information about the selected candidate location and so on. The geocoding application 118 stores the information from the navigation-related application in the geocoder use history database 204.

As discussed above, the geocoding application 118 records information during the geocoding process in the geocoder use history database 204. The geocoding application 118 analyzes the information in the geocoder use history database 204 to determine usage pattern weights that are used to rank candidate locations. Methods for applying usage pattern weights to rank candidate locations are described in U.S. patent application Ser. No. 12/694,413 filed on Jan. 27, 2010, the entire disclosure of which is incorporated by reference herein. Additionally, the geocoding application 118 analyzes the information in the geocoder use history database 204 to update and improve the data representing geographic features in the geographic database 110.

Figure 4:
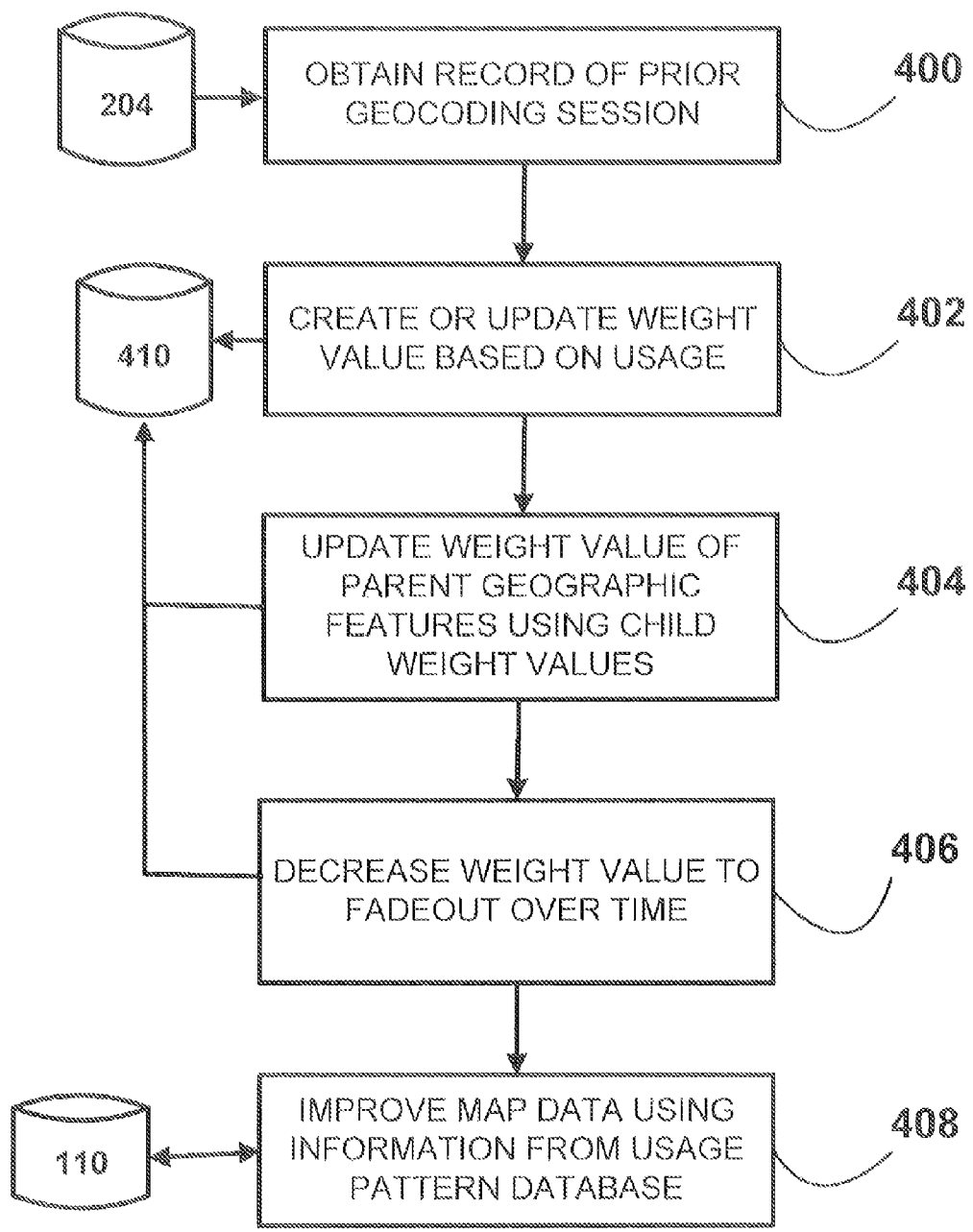
FIG. 4 is a flow chart of a method for determining usage pattern weights and geographic database improvements, according to an example embodiment.

FIG. 4 is a flow chart illustrating the steps performed by the geocoding application 118 to determine the usage pattern weights and to improve the geographic database 110. At step 400, the geocoding application 118 obtains a record of a prior geocoding session from the geocoder use history database 210. In one embodiment, the record of the prior geocoding session identifies the result or candidate location selected by the user.

At step 402, the geocoding application 118 creates or modifies the usage pattern weight value using the usage pattern of the candidate location by increasing the weight value or rating for the candidate location that has been selected by a user in a prior geocoding session. The initial values for the weight values before being modified by usage patterns may be based on static attribution of overall importance, such as by population, number of assigned streets to the area associated to a place, geometric extent of an area associated with a place. For marketing names for events, the initial weight values may be based on expected or historic attendance.

The usage pattern weight value may be increased by a predetermined amount each time the candidate location is selected during one of the geocoding sessions. Alternatively, the usage pattern weight value may be increased by a predetermined amount each time the candidate location is selected a predetermined number of times. The amount of the increase for the usage pattern weight value may be chosen to determine how fast the geocoder adapts to a new usage pattern. The geocoding application 118 stores the usage pattern weight values in a weight database 410. The usage pattern weight values from the weight database 410 are associated with the candidate location record representing the respective candidate location. For example, the usage pattern weight value is associated with the ID of the candidate location record.

In one embodiment, the geocoding application 118 decreases the weight value or rating for the candidate location or candidate locations provided in a prior geocoding session that were not selected by the user. For example, the geocoding session provides the results set 306 and the user does not choose any of the candidate locations and continues searching, such as by submitting a new query or modified query. Additionally, the user may have selected one of the candidate locations in the results set only to realize that the selected candidate location is not desired, so the user submits another query. These geocoding cases may be identified by evaluating the records from the geocoder use history database 210 of those geocoding sessions that occurred within a predetermined time from the same origin, such as from the same device, same IP address or same session for internet website users. The usage pattern weight value may be decreased by a predetermined amount each time the candidate location is not selected during one of the geocoding sessions. Alternatively, the usage pattern weight value may be decreased by a predetermined amount each time the candidate location is not selected a predetermined number of times.

At step 404, the geocoding application 118 updates the usage pattern weight values of parent geographic features using the usage pattern weight values of child geographic features. Parent geographic features are composite geographic features; that is, the parent geographic features include other geographic features (child geographic features). For example, an administrative area, such as a city, is a parent geographic feature that includes numerous child geographic features including streets, addresses, points of interest and so on located within the boundaries of the administrative area. Similarly, a street includes several addresses located along the street and several points of interested located along the street. Likewise, a building, such as a high rise office building, may have a single address and include several businesses or points of interest located within the building.

The usage pattern weight values for the administrative area, place, street, neighborhood, building, point of interest or other parent geographic feature are updated using the determined usage pattern field weights of the child geographic features. For example, a street, such as West Randolph Street, Chicago, includes several addresses along the street and numerous points of interest along the street. Users selecting the candidate locations that are located along West Randolph Street, Chicago will increase the usage pattern weight for West Randolph Street, Chicago. The usage pattern weight for the parent geographic feature may be increased by a predetermined amount each time one of the child candidate locations is selected during one of the geocoding sessions. Alternatively, the parent usage pattern weight value may be increased by a predetermined amount each time the child candidate locations are selected a predetermined number of times.

In another embodiment, the usage pattern weight for a parent geographic feature, such as place or street, may be increased if the geographic database is improved with a number of manually entered or verified child geographic features, such as points of interests located at the place or along the street. The usage pattern weight for a parent geographic feature, such as a place or street, may be decreased if the geographic database contains a number of child geographic features, such as points of interests, that are not verified to be located at the place or along the street, such as unverified information provided by community type sources.

At step 406, the geocoding application 118 decreases the usage pattern weight values to fadeout over time. The geocoding application 118 obtains the usage pattern weight values from the weight database 410. In one embodiment, the geocoding application 118 applies an exponential time fade out to the weights to forget the old usage patterns; other time fade out options may be used. The decreased usage pattern weight values are stored in the weight database 410.

At step 408, the geocoding application 118 improves the geographic data in the geographic database 110 using information from the usage pattern database 204. The geocoding application 118 or another application may analyze the information from the usage pattern database 204 to identify errors in the candidate location records or to identify improvement for the candidate location records. For example, the usage pattern database 204 may contain several records of geocoding sessions in which a name of a candidate location that was selected is written in the same wrong way, such as misspelled; the geographic database is improved by including a candidate location record having text of the common misspelling. Additionally, several records from the database 204 may indicate a name being commonly abbreviated, and the improvement to the geographic database is providing a candidate location record having text with the common abbreviation.

Furthermore, several records from the database 204 may show an alternative name for a selected candidate location, such as a nickname to a place, and the improvement to the geographic database is providing a candidate location record having text with the alternative name. In another embodiment, several records from the database 204 may show which language is the most frequent language used to refer to a place, and the improvement to the geographic database is providing candidate location records having text with the more frequently used language. For example, in Armenia, the official language is Armenian, but people may frequently speak and perform searches in Russian. In another embodiment, several records from the database 204 may show which address components are used by users located in different countries, and the improvement to the geographic database is providing a candidate location records having text with the more frequently used address components. For example, the address components may be street+city or street+city+district or building name+city or point of interest+neighborhood+city.

The above process has been described in conjunction with geocoding; however, the above process of text matching and applying weights based on usage patterns to rank candidates may be readily applied to other processes including business and people finding applications as well as search engines.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A computer implemented method of operating a navigation system to provide geographic location information, the method comprising:

receiving a text string query for only a child geographic location;

providing a plurality of candidate geographic locations for the child geographic location from a geographic database;

receiving a selection of one of the candidate geographic locations from a user;

recording the candidate geographic location that was selected in a use history database;

increasing, using a processor, a usage pattern weight for the candidate geographic location that was selected; and increasing, using the processor, a usage pattern weight for a parent geographic feature that includes the child geographic location from the text string query, wherein the parent geographic feature is a composite geographic feature that includes other geographic features.

2. The method of claim 1 wherein the parent geographic feature is selected from a group consisting of a road, a building, and an administrative area.

3. The method of claim 1 further comprising:
recording a location of a user in the use history database.

4. The method of claim 1 further comprising:
recording the query in the use history database.

5. The method of claim 1 further comprising:
recording a search type in the use history database.

6. The method of claim 1 further comprising:
obtaining data records that represent a plurality of candidate geographic locations from the geographic database, each of the data records comprising a record text string; and computing a text matching score for the candidate geographic locations, the text matching score indicates how much of the text string query matches the record text string.

7. The method of claim 1 further comprising:
applying a time fade out to reduce the usage pattern weight.

8. The method of claim 1 further comprising:
receiving feedback from the user regarding the provided candidate geographic locations; and storing the feedback in the use history database.

9. The method of claim 1 further comprising:
analyzing the data stored in the use history database to improve the geographic database.

10. A computer implemented method of operating a navigation system to provide geographic location information, the method comprising:

receiving a text string query representing a request for information;

providing a plurality of candidate information records for the queried information from a database;

receiving a selection of one of the candidate information records from a user, wherein the one of the candidate information records is a street address;

recording the candidate information record that was selected in a use history database;

increasing, using a processor, a usage pattern weight for the street address in the candidate information record that was selected; and increasing, using the processor, a usage pattern weight for a parent information record that includes the candidate information record that was selected, wherein the parent information describes an area including the street address.

11. The method of claim 10 further comprising:
recording a location of a user in the use history database.

12. The method of claim 10 further comprising:
recording the query in the use history database.

13. The method of claim 10 further comprising:
recording a search type in the use history database.

14. The method of claim 10 further comprising:
applying a time fade out to reduce the usage pattern weight.

15. The method of claim 10 further comprising:
receiving feedback from the user regarding the provided candidate information records; and storing the feedback in the use history database.

16. A navigation system comprising:
a geographic database;
a computer; and
a geocoding program executed on the computer, the geocoding program receives a query text string associated with only a child geographic location, provides a plurality of candidate locations, receives a selection of one of the candidate child locations, increases a usage pattern weight for the candidate child location that was selected, and increases a usage pattern weight for a parent geographic feature that includes the candidate child location that was selected, wherein the usage pattern weight for the parent geographic feature is increased by a predetermined amount when the candidate child location is selected a plurality of times.

17. The system of claim 16 wherein the geocoding program stores the query in a use history database.

18. The system of claim 16 wherein the geocoding program receives feedback from the user regarding the provided candidate locations.

19. The system of claim 16 wherein the geocoding program stores the selected candidate location in a use history database and analyzes the data stored in the use history database to improve the geographic database.

20. The system of claim 16 wherein the parent geographic feature is selected from the group of a road, a building, a point of interest and an administrative area.

* * * * *